United States Patent
Ayabe et al.

(10) Patent No.: US 9,580,580 B2
(45) Date of Patent: Feb. 28, 2017

(54) CELLULOSE ESTER-BASED RESIN COMPOSITION

(71) Applicant: ADEKA CORPORATION, Tokyo (JP)

(72) Inventors: Takashi Ayabe, Saitama (JP); Yuki Endo, Saitama (JP); Tetsuya Seguchi, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 14/408,686

(22) PCT Filed: Jun. 5, 2013

(86) PCT No.: PCT/JP2013/065629
§ 371 (c)(1),
(2) Date: Jan. 23, 2015

(87) PCT Pub. No.: WO2014/002720
PCT Pub. Date: Jan. 3, 2014

(65) Prior Publication Data
US 2015/0183967 A1    Jul. 2, 2015

(30) Foreign Application Priority Data

Jun. 28, 2012 (JP) ................................. 2012-145192

(51) Int. Cl.
| | | |
|---|---|---|
| *C08L 1/12* | (2006.01) | |
| *C08K 5/134* | (2006.01) | |
| *C08K 5/523* | (2006.01) | |
| *C08K 5/526* | (2006.01) | |
| *C08K 5/527* | (2006.01) | |

(52) U.S. Cl.
CPC .............. *C08L 1/12* (2013.01); *C08K 5/1345* (2013.01); *C08K 5/523* (2013.01); *C08K 5/526* (2013.01); *C08K 5/527* (2013.01); *C08L 2201/02* (2013.01)

(58) Field of Classification Search
CPC ........... C08L 1/12; C08K 5/527; C08K 5/526; C08K 5/1345; C08K 5/23
See application file for complete search history.

(56) References Cited

U.S. PATENT DOCUMENTS

2002/0049268 A1    4/2002  White et al.
2004/0212892 A1*  10/2004  Tsujimoto .................... 359/599

FOREIGN PATENT DOCUMENTS

| | | |
|---|---|---|
| JP | 2006-28429 A | 2/2006 |
| JP | 2006-176596 A | 7/2006 |
| JP | 2007-169592 A | 7/2007 |
| JP | 2008-202009 A | 9/2008 |
| JP | 2011-21182 A | 2/2011 |
| JP | 2011-231283 A | 11/2011 |
| WO | WO 2010/001677 A1 | 1/2010 |

OTHER PUBLICATIONS

Machine translation of JP 2007-169592. Jul. 2007.*
International Search Report for PCT/JP2013/065629 mailed on Jul. 9, 2013.
Extended European Search Report for Appl. No. 13810494.8 dated Nov. 4, 2015.

* cited by examiner

*Primary Examiner* — John Uselding
(74) *Attorney, Agent, or Firm* — Birch, Stewart, Kolasch & Birch, LLP

(57) ABSTRACT

Provided is a cellulose ester-based resin composition having excellent processability, resistance to coloration caused by processing and flame retardancy. Also provided is a molded article having excellent color tone and flame retardancy. The cellulose ester-based resin composition of the present invention is characterized by comprising 1 to 50 parts by mass of a phosphate represented by the following Formula (1) with respect to 100 parts by mass of a cellulose ester-based resin:

(wherein, $R^1$ and $R^2$ each independently represent a hydrogen atom or a methyl group; and n represents an integer of 1 to 5).

7 Claims, No Drawings

CELLULOSE ESTER-BASED RESIN COMPOSITION

TECHNICAL FIELD

The present invention relates to a cellulose ester-based resin composition and a molded article thereof.

BACKGROUND ART

Synthetic resins such as polyesters, polyamides and polycarbonates are used as materials that constitute, for example, electrical and electronic devices such as personal computers, printers and copying machines; home electric appliances such as televisions and refrigerators; packaging materials such as containers and packages; building materials such as wall and flooring materials; and automobile interior and exterior materials. These synthetic resins have excellent moldability, productivity and mechanical properties; however, since they are produced using petroleum as raw material, when they are disposed in nature, their low decomposability imposes a large stress to the environment such as soil. In addition, incineration of these synthetic resins leads to generation of carbon dioxide and thus presents a problem from the standpoint of preventing global warming.

On the other hand, plant-derived resins have excellent biodegradability and thus do not put much stress to the soil environment. In addition, since these resins are, in the first place, synthesized by photosynthetic reaction performed by plants using carbon dioxide and water in the atmosphere as raw materials, even if they are incinerated and carbon dioxide is consequently generated, the balance of carbon dioxide in the atmosphere stays even; therefore, these plant-derived resins are regarded as so-called "carbon-neutral" materials. From the standpoint of preventing global warming, it is urgent to replace petroleum-derived resins with such carbon-neutral plant-derived resins.

As a plant-derived resin, a cellulose derivative has been utilized. For example, as film materials, cellulose esters such as cellulose acetate, cellulose acetate propionate, cellulose acetate butyrate and cellulose acetate phthalate have been conventionally used.

However, these cellulose derivatives such as cellulose esters have poor moldability by themselves and they also have a problem in terms of the processability. Thus, when these cellulose derivatives are thermally molded by injection molding or the like, it is necessary to add a plasticizer thereto. In addition, since the cellulose esters are colored during processing and molding, there is a problem in terms of the color tone of a molded article obtained therefrom.

It has been proposed to add a phosphate as the plasticizer (Patent Documents 1 and 2). However, the processability and the moldability are largely different depending on kinds of phosphates, and satisfactory performance has not been attained. In addition, it is considered necessary to solve the coloration problem. Furthermore, there is still room for improvement with respect to the heat resistance.

On another front, as molding materials to be used in place of petroleum-derived resins, cellulose derivatives such as cellulose esters are demanded to have flame retardancy as well.

RELATED ART DOCUMENTS

Patent Documents

Patent Document 1: Japanese Unexamined Patent Application Publication No. 2006-28429
Patent Document 2: Japanese Unexamined Patent Application Publication No. 2006-176596

SUMMARY OF THE INVENTION

Problems to be Solved by the Invention

Therefore, a first object of the present invention is to provide a cellulose ester-based resin composition having excellent processability, resistance to coloration caused by processing and flame retardancy.

A second object of the present invention is to provide a molded article having excellent color tone and flame retardancy, which is obtained from the cellulose ester-based resin composition.

Means for Solving the Problems

In order to solve the above-described problems, the present inventors intensively studied and discovered that a phosphate having a specific structure shows excellent processability, resistance to coloration and heat resistance and that a cellulose ester-based resin composition having excellent processability, resistance to coloration caused by processing and flame retardancy can be obtained by incorporating such a phosphate into a cellulose ester resin composition, thereby completing the present invention.

That is, the cellulose ester-based resin composition of the present invention is characterized by comprising 1 to 50 parts by mass of a phosphate represented by the following Formula (1) with respect to 100 parts by mass of a cellulose ester-based resin:

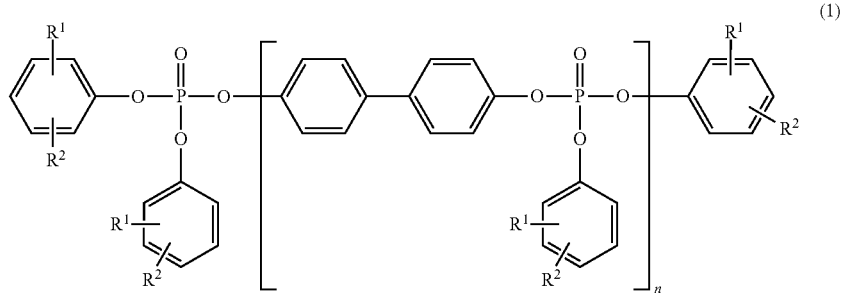

(1)

(wherein, $R^1$ and $R^2$ each independently represent a hydrogen atom or a methyl group; and n represents an integer of 1 to 5).

It is preferred that the cellulose ester-based resin composition of the present invention further comprise at least one selected from the group consisting of a phenol compound represented by the following Formula (2), a triaryl phosphite compound represented by the following Formula (3) and a diaryl pentaerythritol diphosphite compound represented by the following Formula (4), each in an amount of 0.01 to 10 parts by mass with respect to 100 parts by mass of the above-described cellulose ester-based resin:

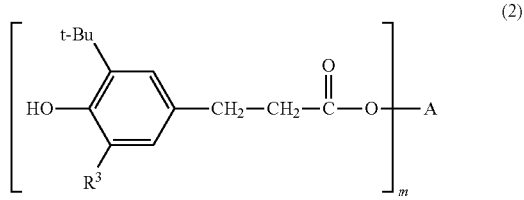

(2)

(wherein, $R^3$ represents an alkyl group having 1 to 4 carbon atoms; m represents an integer of 1 to 4; and A represents a residue of a mono- to tetra-hydric alcohol from which m hydroxyl groups are removed);

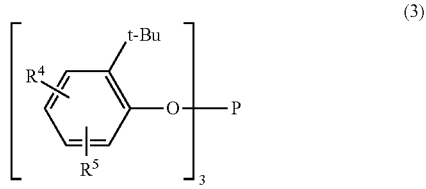

(3)

(wherein, $R^4$ and $R^5$ each independently represent a hydrogen atom or an alkyl group having 1 to 4 carbon atoms); and

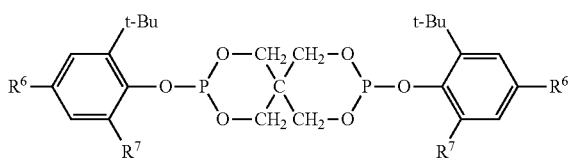

(4)

(wherein, $R^6$ and $R^7$ each independently represent a hydrogen atom or an alkyl group having 1 to 4 carbon atoms).

The molded article of the present invention is characterized in that it is obtained by molding the above-described cellulose ester-based resin composition.

Effects of the Invention

According to the present invention, a cellulose ester-based resin composition having excellent processability, resistance to coloration caused by processing and flame retardancy as well as a molded article having excellent color tone and flame retardancy can be provided.

MODE FOR CARRYING OUT THE INVENTION

The present invention will now be described in detail.

First, the cellulose ester-based resin used in the present invention will be described.

Examples of the cellulose ester-based resin include cellulose organic acid esters such as cellulose acetate, cellulose propionate, cellulose butyrate, cellulose acetate propionate and cellulose acetate butyrate; derivatives of these cellulose organic acid esters, including grafts such as polycaprolactone-grafted cellulose acetate; organic acid ester ethers of cellulose, including C2 to C6 acyl cellulose-C1 to C6 alkyl ethers such as acetyl methyl cellulose, acetyl ethyl cellulose and acetyl propyl cellulose, and C2 to C6 acyl cellulose hydroxy-C2 to C6 alkyl ethers such as acetyl hydroxyethyl cellulose and acetyl hydroxypropyl cellulose; cellulose inorganic acid esters such as cellulose nitrate, cellulose sulfate and cellulose phosphate; and cellulose organic-inorganic mixed acid esters, such as cellulose nitrate acetate. These cellulose esters may be used individually, or two or more thereof may be used in combination.

Among these cellulose ester-based resins, cellulose organic acid esters are preferred. Cellulose esters of a carboxylic acid having 2 to 6 carbon atoms are more preferred, and cellulose acetate is particularly preferred.

The cellulose ester-based resin composition of the present invention comprises a phosphate represented by the following Formula (1):

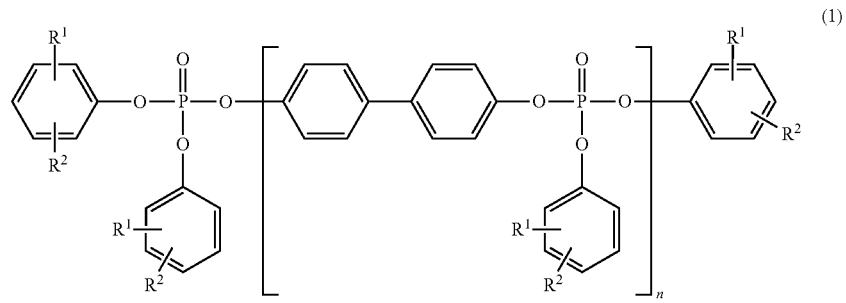

(1)

(wherein, $R^1$ and $R^2$ each independently represent a hydrogen atom or a methyl group; and n represents an integer of 1 to 5).

The above-described phosphate represented by the Formula (1) may be used individually, or two or more thereof may be used in combination.

Examples of the phosphate represented by the Formula (1) include the following Compound Nos. 1 and 2.

Compound No. 1

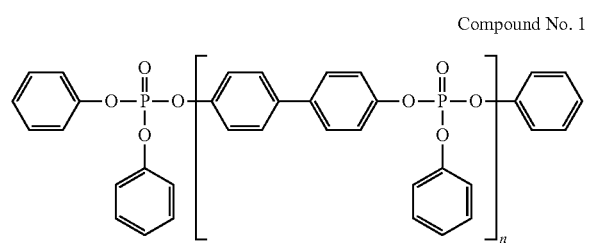

(wherein, n represents an integer of 1 to 5)

Compound No. 2

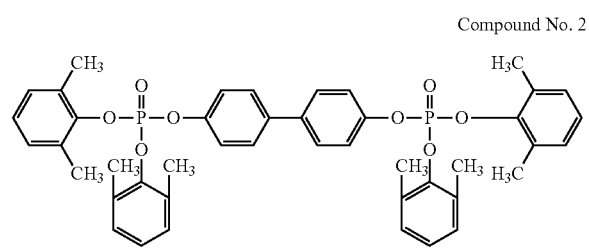 [SMILES: Cc1cccc(C)c1OP(=O)(Oc1ccc(-c2ccc(OP(=O)(Oc3c(C)cccc3C)Oc3c(C)cccc3C)cc2)cc1)Oc1c(C)cccc1C]

The method of synthesizing the phosphate represented by the Formula (1) is not particularly restricted and, for example, it can be synthesized by allowing 4,4'-dihydroxybiphenyl, phenol and phosphorus oxychloride to react with each other in the presence of a catalyst such as magnesium chloride and subsequently subjecting the resultant to dehydrochlorination, or by a transesterification reaction between triphenyl phosphate and 4,4'-dihydroxybiphenyl.

The amount of the phosphate represented by the Formula (1) in the cellulose ester-based resin composition of the present invention is 1 to 50 parts by mass, preferably 5 to 40 parts by mass, more preferably 10 to 35 parts by mass, with respect to 100 parts by mass of the cellulose ester-based resin.

It is preferred that the cellulose ester-based resin composition of the present invention further comprise at least one selected from the group consisting of a phenol compound represented by the below-described Formula (2), a triaryl phosphite compound represented by the below-described Formula (3) and a diaryl pentaerythritol diphosphite compound represented by the below-described Formula (4), each in an amount of 0.01 to 10 parts by mass with respect to 100 parts by mass of the cellulose ester-based resin.

The phenol compound represented by the following Formula (2) will now be described:

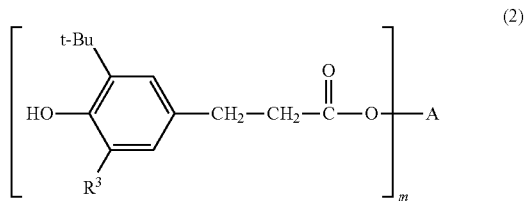

(wherein, $R^3$ represents an alkyl group having 1 to 4 carbon atoms; m represents an integer of 1 to 4; and A represents a residue of a mono- to tetra-hydric alcohol from which m hydroxyl groups are removed).

Examples of the alkyl group having 1 to 4 carbon atoms which is represented by $R^3$ in the Formula (2) include methyl, ethyl, propyl, isopropyl, butyl, sec-butyl, tert-butyl and isobutyl.

The mono- to tetra-hydric alcohol yielding the residue represented by A in the Formula (2) is preferably a mono- to tetra-hydric alcohol having 1 to 30 carbon atoms. Examples thereof include monohydric alcohols such as methanol, ethanol, butanol, octanol, 2-ethylhexanol, decanol, dodecanol, tridecanol, isotridecanol, tetradecanol, hexadecanol, octadecanol, eicosanol, docosanol, and triacontanol; dihydric alcohols such as ethylene glycol, diethylene glycol, triethylene glycol, thiodiethanol, propylene glycol, butylene glycol, neopentyl glycol, 1,6-hexanediol, 1,10-decanediol, 2,2-bis(4-(2-hydroxyethoxy)phenyl)propane and 3,9-bis(1,1-dimethyl-2-hydroxyethyl)-2,4,8,10-tetraoxaspiro[5,5]undecane; trihydric alcohols such as glycerol, trimethylolethane, trimethylolpropane and tris(2-hydroxyethyl) isocyanurate; and tetrahydric alcohols such as pentaerythritol, ditrimethylolethane, ditrimethylolpropane and diglycerol.

Specific examples of the phenol compound represented by the Formula (2) include stearyl-3-(3,5-di-tert-butyl-4-hydroxyphenyl)propionate, hexamethylene-bis-3-(3,5-di-tert-butyl-4-hydroxyphenyl)propionate, thiodiethylene-bis(3-(3,5-di-tert-butyl-4-hydroxyphenyl)propionate), 3,6-dioxaoctane-1,8-bis(3-(3-tert-butyl-5-methyl-4-hydroxyphenyl)propionate), 2,2-bis(4-(2-(3-(3,5-di-tert-butyl-4-hydroxyphenyl)propionyloxy)ethyl)phenyl) propane, 3,9-bis(1,1-dimethyl-2-(3-(3-tert-butyl-5-methyl-4-hydroxyphenyl)propionyloxy)ethyl)2,4,8,10-tetraoxaspiro[5.5]undecane, tris(2-(3-(3,5-di-tert-butyl-4-hydroxyphenyl)propionyloxy)ethyl)isocyanurate and tetrakis(3-(3,5-di-tert-butyl-4-hydroxyphenyl)propionyloxymethyl)methane, among which tetrakis(3-(3,5-di-tert-butyl-4-hydroxyphenyl)propionyloxymethyl)methane is particularly preferred.

The triaryl phosphite compound represented by the following Formula (3) will now be described:

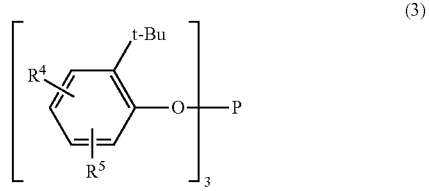

(wherein, $R^4$ and $R^5$ each independently represent a hydrogen atom or an alkyl group having 1 to 4 carbon atoms).

Examples of the alkyl group having 1 to 4 carbon atoms which is represented by $R^4$ and $R^5$ in the Formula (3) include methyl, ethyl, propyl, isopropyl, butyl, sec-butyl, tert-butyl and isobutyl.

Specific examples of the triaryl phosphite compound represented by the Formula (3) include tris(2-tert-butylphenyl)phosphite, tris(2,4-di-tert-butylphenyl)phosphite, tris(2,5-di-tert-butylphenyl)phosphite, tris(2-tert-butyl-4-methylphenyl)phosphite, tris(2-tert-butyl-5-methylphenyl) phosphite and tris(2-tert-butyl-4,6-dimethylphenyl) phosphite, among which tris(2,4-di-tert-butylphenyl) phosphite is particularly preferred.

The diaryl pentaerythritol diphosphite compound represented by the following Formula (4) will now be described:

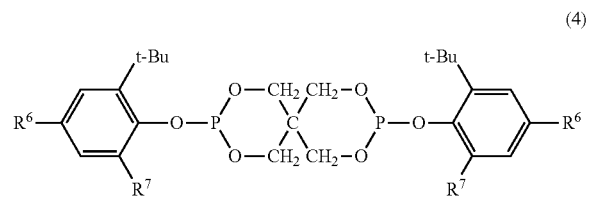

(4)

(wherein, $R^6$ and $R^7$ each independently represent a hydrogen atom or an alkyl group having 1 to 4 carbon atoms).

Examples of the alkyl group having 1 to 4 carbon atoms which is represented by $R^6$ and $R^7$ in the Formula (4) include methyl, ethyl, propyl, isopropyl, butyl, sec-butyl, tert-butyl and isobutyl.

Specific examples of the diaryl pentaerythritol diphosphite compound represented by the Formula (4) include bis(2,4-di-tert-butylphenyl)pentaerythritol diphosphite, bis(2,6-di-tert-butylphenyl)pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, bis(2,6-di-tert-butyl-4-isopropylphenyl)pentaerythritol diphosphite, bis(2,4,6-tri-tert-butylphenyl)pentaerythritol diphosphite, bis(2,6-di-tert-butyl-4-sec-butylphenyl) pentaerythritol diphosphite and bis(2,4-di-tert-butyl-6-methylphenyl)pentaerythritol diphosphite. Among these diaryl pentaerythritol diphosphite compounds, bis(2,4-di-tert-butylphenyl)pentaerythritol diphosphite, bis(2,6-di-tert-butyl-4-methylphenyl)pentaerythritol diphosphite and bis(2,4,6-tri-tert-butylphenyl)pentaerythritol diphosphite are particularly preferred.

In cases where the above-described phenol compound represented by the Formula (2), the above-described triaryl phosphite compound represented by the Formula (3) and the above-described diaryl pentaerythritol diphosphite compound represented by the Formula (4) are incorporated, the total content of these three components is preferably 0.01 to 10 parts by mass, more preferably 0.05 to 5 parts by mass, with respect to 100 parts by mass of the cellulose ester-based resin. When the total content is less than 0.01 parts by mass, the desired coloration-inhibiting effect may not be attained during processing, while when the total content is greater than 10 parts by mass, enhancement of the effect corresponding to the content may not be attained.

In the cellulose ester-based resin composition of the present invention, a plasticizer may be used arbitrarily. Examples of the plasticizer include phthalate-based plasticizers such as dibutyl phthalate, butylhexyl phthalate, diheptyl phthalate, dioctyl phthalate, diisononyl phthalate, diisodecyl phthalate, dilauryl phthalate, dicyclohexyl phthalate and dioctyl terephthalate; adipate-based plasticizers such as dioctyl adipate, diisononyl adipate, diisodecyl adipate and di(butyldiglycol)adipate; phosphate-based plasticizers such as triphenyl phosphate, tricresyl phosphate, trixylenyl phosphate, tri(isopropylphenyl)phosphate, triethyl phosphate, tributyl phosphate, trioctyl phosphate, tri(butoxyethyl)phosphate and octyldiphenyl phosphate; polyester-based plasticizers in which ethylene glycol, diethylene glycol, triethylene glycol, 1,2-propylene glycol, 1,3-propylene glycol, 1,3-butane diol, 1,4-butane diol, 1,5-hexane diol, 1,6-hexane diol, neopentyl glycol or the like is used as a polyhydric alcohol, oxalic acid, malonic acid, succinic acid, glutaric acid, adipic acid, pimelic acid, suberic acid, azelaic acid, sebacic acid, phthalic acid, isophthalic acid, terephthalic acid or the like is used as a dibasic acid and, as required, a monohydric alcohol or a monocarboxylic acid is used as a stopper; polyhydric alcohol ester-based plasticizers, which are obtained by using ethylene glycol, diethylene glycol, triethylene glycol, 1,2-propylene glycol, 1,3-propylene glycol, 1,3-butane diol, 1,4-butane diol, 1,5-hexane diol, 1,6-hexane diol, neopentyl glycol, glycerol, trimethylolpropane, pentaerythritol or the like as a polyhydric alcohol and acetic acid, benzoic acid, p-tert-butyl benzoic acid or the like as a monobasic acid; tetrahydrophthalic acid-based plasticizers; azelaic acid-based plasticizers; sebacic acid-based plasticizers; stearic acid-based plasticizers; citric acid-based plasticizers; trimellitic acid-based plasticizers; pyromellitic acid-based plasticizers; and biphenylene polycarboxylic acid-based plasticizers.

In the cellulose ester-based resin composition of the present invention, a variety of additives such as a phosphorus-based, phenol-based or sulfur-based antioxidant, an ultraviolet absorber and a hindered amine-based light stabilizer can also be incorporated.

Examples of the above-described phosphorus-based antioxidant include triphenyl phosphite, tris(nonylphenyl)phosphite, tris(dinonylphenyl)phosphite, tris(mono-, di-mixed nonylphenyl)phosphite, bis(2-tert-butyl-4,6-dimethylphenyl).ethyl phosphite, diphenyl acid phosphite, 2,2'-methylene-bis(4,6-di-tert-butylphenyl)octyl phosphite, diphenyldecyl phosphite, phenyldiisodecyl phosphite, tributyl phosphite, tris(2-ethylhexyl)phosphite, tridecyl phosphite, trilauryl phosphite, dibutyl acid phosphite, dilauryl acid phosphite, trilauryl trithiophosphite, bis(neopentyl glycol) .1,4-cyclohexane dimethyl diphosphite, distearylpentaerythritol diphosphite, phenyl-4,4'-isopropylidene diphenol.pentaerythritol diphosphite, tetra(C12-15 mixed alkyl)-4,4'-isopropylidene diphenyl phosphite, bis[2,2'-methylene-bis (4,6-diamylphenyl)].isopropylidene diphenyl phosphite, hydrogenated-4,4'-isopropylidene diphenol polyphosphite, bis(octylphenyl).bis[4,4'-n-butylidene-bis(2-tert-butyl-5-methylphenol)].1,6-hexane diol.diphosphite, tetratridecyl.4, 4'-butylidene-bis(2-tert-butyl-5-methylphenol)diphosphite, hexa(tridecyl).1,1,3-tris(2-methyl-5-tert-butyl-4-hydroxyphenyl)butane.triphosphonite, 9,10-dihydro-9-oxa-10-phosphaphenanthrene-10-oxide and 2-butyl-2-ethylpropane diol.2,4,6-tri-tert-butylphenol monophosphite.

Examples of the above-described phenol-based antioxidant include 2,6-di-tert-butyl-p-cresol, 2,6-diphenyl-4-octadesiloxyphenol, distearyl(3,5-di-tert-butyl-4-hydroxybenzyl)phosphonate, tridecyl.3,5-di-tert-butyl-4-hydroxybenzyl thioacetate, 4,4'-thiobis(6-tert-butyl-m-cresol), 2-octylthio-4,6-di(3,5-di-tert-butyl-4-hydroxyphenoxy)-s-triazine, 2,2'-methylene-bis(4-methyl-6-tert-butylphenol), bis[3,3-bis(4-hydroxy-3-tert-butylphenyl)butyric acid]glycol ester, 4,4'-butylidene-bis(4,6-di-tert-butylphenol), 2,2'-ethylidene-bis (4,6-di-tert-butylphenol), 1,1,3-tris(2-methyl-4-hydroxy-5- tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl]isocyanurate, 2-tert-butyl-4-methyl-6-(2-acryloyloxy-3-tert-butyl-5-methylbenzyl)phenol and 3,9-bis[2-(3-tert-butyl-4-hydroxy-5-methylhydrocinnamoyloxy)-1,1-dimethylethyl]-2,4,8,10-tetraoxaspiro[5.5]undecane].

Examples of the above-described sulfur-based antioxidant include dialkyl thiodipropionates such as dilauryl thiodipropionate, dimyristyl thiodipropionate, myristylstearyl thiodipropionate and distearyl thiodipropionate; and β-alkylmercaptopropionates of polyols, such as pentaerythritol tetra(β-dodecylmercaptopropionate).

Examples of the above-described ultraviolet absorber include 2-hydroxybenzophenones such as 2,4-dihydroxybenzophenone, 2-hydroxy-4-methoxybenzophenone, 2-hydroxy-4-octoxybenzophenone, 2-hydroxy-4-tert-butyl-4'-(2-methacryloyloxyethoxyl)benzophenone and 5,5'-methylene-bis(2-hydroxy-4-methoxybenzophenone); 2-(2-hydroxyphenyl)benzotriazoles such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3-dodecyl-5-methylphenyl)benzotriazole, 2-(2-hydroxy-3-tert-butyl-5-C7 to C9 mixed-alkoxycarbonylethylphenyl)triazole, 2-(2-hydroxy-3,5-dicumylphenyl)benzotriazole, 2,2'-methylene-bis(4-tert-octyl-6-benzotriazolylphenol) and polyethylene glycol ester of 2-(2-hydroxy-3-tert-butyl-5-carboxyphenyl)benzotriazole; 2-(2-hydroxyphenyl)-1,3,5-triazines such as 2-(2-hydroxy-4-hexyloxyphenyl)-4,6-diphenyl-1,3,5-triazine, 2-(2-hydroxy-4-methoxyphenyl)-4,6-diphenyl-1,3,5-triazine, 2-(2-hydroxy-4-octoxyphenyl)-4,6-bis(2,4-dimethylphenyl)-1,3,5-triazine and 2-(2-hydroxy-4-acryloyloxyethoxyphenyl)-4,6-bis(2,4-dimethylphenyl)-1,3,5-triazine; benzoates such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate and hexadecyl-3,5-di-tert-butyl-4-hydroxybenzoate; substituted oxanilides such as 2-ethyl-2'-ethoxyoxanilide and 2-ethoxy-4'-dodecyloxanilide; and cyanoacrylates such as ethyl-α-cyano-β,β-diphenylacrylate and methyl-2-cyano-3-methyl-3-(p-methoxyphenyl)acrylate.

Examples of the above-described hindered amine-based light stabilizer include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-pentamethyl-4-piperidyl)sebacate, bis(1-octoxy-2,2,6,6-tetramethyl-4-piperidyl)sebacate, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butane tetracarboxylate, bis(2,2,6,6-tetramethyl-4-piperidyl).bis(tridecyl)-1,2,3,4-butane tetracarboxylate, bis(1,2,2,6,6-pentamethyl-4-piperidyl).bis(tridecyl)-1,2,3,4-butane tetracarboxylate, bis(1,2,2,6,6-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/dibromoethane polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino-s-triazine-6-ylamino] undecane, 1,6,11-tris[2,4-bis(N-butyl-N-(1,2,2,6,6-pentamethyl-4-piperidyl)amino-s-triazine-6-ylamino] undecane, 3,9-bis[1,1-dimethyl-2-{tris(2,2,6,6-tetramethyl-4-piperidyloxycarbonyloxy)butylcarbonyloxy}ethyl]-2,4,8,10-tetraoxaspiro[5.5]undecane and 3,9-bis[1,1-dimethyl-2-{tris(1,2,2,6,6-pentamethyl-4-piperidyloxycarbonyloxy)butylcarbonyloxy}ethyl]-2,4,8,10-tetraoxaspiro[5.5] undecane.

In the cellulose ester-based resin composition of the present invention, as required, a flame retardancy-imparting additive(s) usually incorporated in synthetic resins, for example, a triazine ring-containing compound, a metal hydroxide, a phosphate-based flame retardant, a condensed phosphate-based flame retardant, an inorganic phosphorus-based flame retardant, a (poly)phosphate-based flame retardant, a halogen-based flame retardant, a silicon-based flame retardant, an antimony oxide such as antimony trioxide, other inorganic flame retardant aid, other organic flame retardant aid and/or an anti-dripping agent, may also be added.

Examples of the above-described triazine ring-containing compound include melamine, ammeline, benzoguanamine, acetoguanamine, phthalodiguanamine, melamine cyanurate, melamine pyrophosphate, butylene diguanamine, norbornene diguanamine, methylene diguanamine, ethylene dimelamine, trimethylene dimelamine, tetramethylene dimelamine, hexamethylene dimelamine and 1,3-hexylene dimelamine.

Examples of the above-described metal hydroxide include magnesium hydroxide, aluminum hydroxide, calcium hydroxide, barium hydroxide, zinc hydroxide and KISUMA 5A (magnesium hydroxide: manufactured by Kyowa Chemical Industry Co., Ltd.).

Examples of the above-described phosphate-based flame retardant include trimethyl phosphate, triethyl phosphate, tributyl phosphate, tributoxyethyl phosphate, trischloroethyl phosphate, trisdichloropropyl phosphate, triphenyl phosphate, tricresyl phosphate, cresyldiphenyl phosphate, trixylenyl phosphate, octyl diphenyl phosphate, xylenyl diphenyl phosphate, trisisopropylphenyl phosphate, 2-ethylhexyl diphenyl phosphate, t-butylphenyl diphenyl phosphate, bis-(t-butylphenyl)phenyl phosphate, tris-(t-butylphenyl)phosphate, isopropylphenyl diphenyl phosphate, bis-(isopropylphenyl)diphenyl phosphate and tris-(isopropylphenyl) phosphate.

Examples of the above-described condensed phosphate-based flame retardant include 1,3-phenylene-bis(diphenylphosphate), 1,3-phenylene-bis(dixylenylphosphate) and bis-phenol A-bis(diphenylphosphate).

Examples of the above-described (poly)phosphate-based flame retardant include ammonium salts and amine salts of polyphosphoric acids, such as ammonium polyphosphate, melamine polyphosphate, piperazine polyphosphate, melamine pyrophosphate and piperazine pyrophosphate.

Examples of the above-described other inorganic flame retardant aid include inorganic compounds such as titanium oxide, aluminum oxide, magnesium oxide, hydrotalcites, talc and montmorillonite, and surface-treated products thereof. For example, a variety of commercially available products such as TIPAQUE R-680 (titanium oxide: manufactured by Ishihara Sangyo Kaisha, Ltd.), KYOWAMAG 150 (magnesium oxide: manufactured by Kyowa Chemical Industry Co., Ltd.), DHT-4A (hydrotalcite: manufactured by Kyowa Chemical Industry Co., Ltd.) and ALCAMIZER 4 (zinc-modified hydrotalcite: manufactured by Kyowa Chemical Industry Co., Ltd.) can be used.

Examples of the above-described other organic flame retardant aid include pentaerythritol.

Examples of the anti-dripping agent include fluorine-containing anti-dripping agents, for example, fluorocarbon resins such as polytetrafluoroethylene, polyvinylidene fluoride and polyhexafluoropropylene; and alkali metal perfluoroalkanesulfonate compounds and alkaline earth metal perfluoroalkanesulfonate compounds, such as sodium perfluoromethane sulfonate, potassium perfluoro-n-butane sulfonate, potassium perfluoro-t-butane sulfonate, sodium perfluorooctane sulfonate and calcium perfluoro-2-ethylhexane sulfonate. These anti-dripping agents may be used individually, or two or more thereof may be used as a mixture. Further, as other anti-dripping agent, a layered silicate such as a silicon rubber or talc can also be incorporated.

The additives normally used in a synthetic resin to impart flame retardancy, such as an anti-dripping agent, are incorporated in an amount of preferably 0.05 to 5 parts by mass with respect to 100 parts by mass of the cellulose ester-based resin.

In addition, in the cellulose ester-based resin composition of the present invention, as required, additives normally used in synthetic resins, for example, an antistatic agent, a cross-linking agent, an anti-fogging agent, an anti-plate-out agent, a surface treatment agent, a lubricant, a fluorescent agent, an antifungal agent, an antibacterial agent, a foaming agent, a metal inactivator, a mold-release agent, a pigment and a processing aid, may also be incorporated in such a range that does not impair the effects of the present invention.

As a method of adding a phosphate represented by the Formula (1) as well as a phenol compound represented by the Formula (2), a triaryl phosphite compound represented by the Formula (3), a diaryl pentaerythritol diphosphite compound represented by the Formula (4) and the above-described other additives to the cellulose ester-based resin, a known addition method can be appropriately employed. Examples thereof include a method in which the materials to be incorporated are separately added to the resin and the resultant is then mixed using a Henschel mixer or the like before being fed to a processing machine; a method in which an arbitrary combination of the materials other than the resin is prepared in advance as a mixture and this mixture is then made into the form of powder or granules before being added to the resin; a method in which the materials to be incorporated is added to the resin at a high concentration to prepare a masterpellet and this masterpellet is added to the resin; and a method in which, using an extruder having a plurality of feed ports, the materials to be incorporated are added to the resin through a feed port different from the one through which the resin is fed.

By molding the cellulose ester-based resin composition of the present invention, a cellulose ester-based resin molded article can be obtained. The molding method is not particularly restricted, and examples thereof include extrusion processing, calender processing, injection molding, rolling, compression molding and blow molding. Molded articles having various shapes, such as resin plates, sheets, films, fibers and special shape articles, can be thereby produced.

A molded article obtained from the cellulose ester-based resin composition of the present invention has excellent color tone and flame retardancy.

The cellulose ester-based resin composition of the present invention and a molded article thereof can be used in a wide range of industrial fields, including the fields of electric/electronic/communication, agriculture/forestry/fisheries, mining, construction, food, fiber, clothing, health care, coal, petroleum, rubber, leather, automobiles, precision instruments, lumber, building materials, civil engineering, furnitures, printing and musical instruments.

More specific examples of the use of the cellulose ester-based resin composition of the present invention and a molded article thereof include office automation equipments, such as printers, personal computers, word processors, keyboards, PDA (Personal Digital Assistant) devices, telephones, copy machines, facsimiles, ECRs (electronic cash registers), electronic calculators, electronic organizers, cards, holders and stationeries; household electric appliances, such as laundry machines, refrigerators, vacuum cleaners, microwave ovens, lighting equipments, game machines, irons and kotatsu; audio and visual devices, such as televisions, video tape recorders, video cameras, radio-cassette players, tape recorders, mini discs, CD players, speakers and liquid crystal displays; electric and electronic components communication devices, such as connectors, relays, capacitors, switches, printed boards, coil bobbins, semiconductor sealing materials, LED sealing materials, electric wires, cables, transformers, deflection yokes, distribution boards and clocks; automobile interior and exterior materials; platemaking films; adhesive films; bottles; food containers; food packaging films; pharmaceutical and medical wrapping films; product packaging films; agricultural films; agricultural sheets; and greenhouse films.

Furthermore, the cellulose ester-based resin composition of the present invention and a molded article thereof can also be used in other various applications, including materials of automobiles, vehicles, ships, airplanes, buildings and houses as well as materials for construction and civil engineering, such as seats (stuffing, cover materials and the like), belts, ceiling cover, convertible tops, armrests, door trims, rear package trays, carpets, mats, sun visors, wheel covers, mattress covers, air-bags, insulating materials, straps, strap belts, wire coating materials, electric insulating materials, paints, coating materials, veneer materials, floor materials, baffle walls, wallpapers, wall decorating materials, exterior materials, interior materials, roof materials, deck materials, wall materials, pillar materials, floor boards, fence materials, framing and moulding materials, window and door-shaped materials, shingle boards, sidings, terraces, balconies, soundproof boards, thermal insulating boards and window materials; and household articles and sporting goods, such as clothing materials, curtains, sheets, nonwoven fabrics, plywood boards, synthetic fiber boards, rugs, doormats, leisure sheets, buckets, hoses, containers, eye glasses, bags, casings, snow goggles, ski, rackets, tents and musical instruments.

EXAMPLES

The present invention will now be described concretely by way of examples thereof. It is noted here that, in the following examples and the like, unless otherwise specified, the units indicating an amount are based on mass.

Examples 1 to 3 and Comparative Examples 1 to 5

Each cellulose ester-based resin composition was prepared in accordance with the respective formulations shown in Tables 1 and 2 below. The thus obtained cellulose ester-based resin was kneaded under the below-described test conditions to examine the processability and the resistance to coloration caused by processing. The processability was evaluated based on the torque measured during the kneading and the resistance to coloration caused by processing was evaluated in the below-described manner.

As a phosphate represented by the above-described Formula (1), the following phosphate compound-1 was used. The phosphate compound-1 is a mixture of compounds having different values of n.

Phosphate Compound-1:

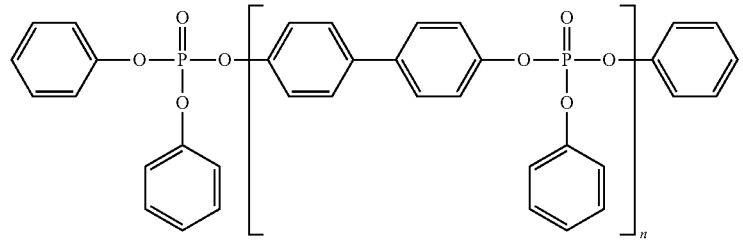

(wherein, n represents a number of 1 to 5)

Further, the following phenol compound-1, triaryl phosphite compound-1 and diaryl pentaerythritol diphosphite compound-2 were used as a phenol compound represented by the above-described Formula (2), a triaryl phosphite compound represented by the above-described Formula (3) and a diaryl pentaerythritol diphosphite compound represented by the above-described Formula (4), respectively.

Phenol Compound-1:

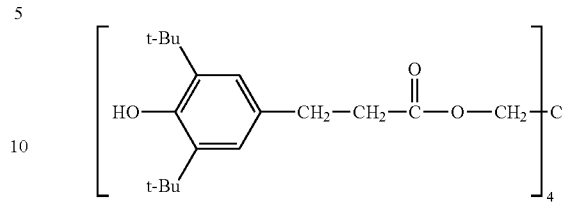

Triaryl Phosphite Compound-2:

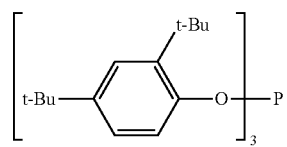

Diaryl Pentaerythritol Diphosphite Compound-3:

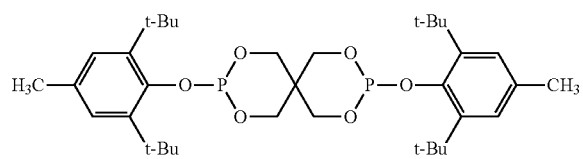

Moreover, as comparative compounds, the following comparative phosphate compound-1 and comparative phosphate compound-2 were used.

Comparative Phosphate Compound-1:

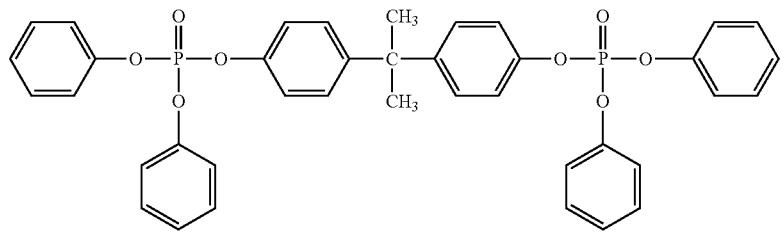 [SMILES: CC(C)(c1ccc(OP(=O)(Oc2ccccc2)Oc2ccccc2)cc1)c1ccc(OP(=O)(Oc2ccccc2)Oc2ccccc2)cc1]

Comparative Phosphate Compound-2:

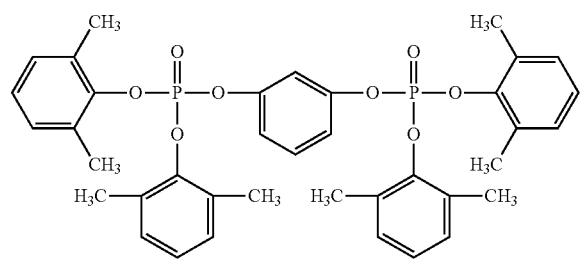 [SMILES: Cc1cccc(C)c1OP(=O)(Oc1cccc(OP(=O)(Oc2c(C)cccc2C)Oc2c(C)cccc2C)c1)Oc1c(C)cccc1C]

<Processing Test Conditions>
Apparatus: uniaxial extruder (LABOPLASTOMILL 75C-100: trade name, manufactured by Toyo Seiki Seisaku-sho, Ltd.)
Processing temperature: 230° C.
Kneading time: 10 minutes
Rotation rate: 10 rpm <Criteria for Evaluation of Resistance to Coloration Caused by Processing>
After kneading for 10 minutes each cellulose ester-based resin composition, the color thereof was visually examined and evaluated based on the following criteria.
◎: No coloration caused by the processing was observed.
○: Slight coloration caused by the processing was observed.
Δ: Coloration caused by the processing was observed.
x: Prominent coloration caused by the processing was observed.

TABLE 1

| | Example | | | Comparative Example | | |
|---|---|---|---|---|---|---|
| | 1 | 2 | 3 | 1 | 2 | 3 |
| Cellulose acetate*1 | 100 | 100 | 100 | 100 | 100 | 100 |
| Phosphate compound-1 *2 | 10 | 10 | 10 | | | |
| Phenol compound-1 *3 | | 0.1 | 0.1 | | | |
| Triaryl phosphite compound-1 *4 | | 0.1 | | | | |
| Diaryl pentaerythritol diphosphite compound-1 *5 | | | 0.1 | | | |
| Comparative phosphate compound-1 | | | | | 10 | |
| Comparative phosphate compound-2 | | | | | | 10 |
| Resistance to processing Torque (N · m) | 2.5-20 | 2.5-17 | 2.5-20 | excessive torque (>200) | Kneading was impossible due to poor compatibility | Kneading was impossible due to poor compatibility |
| Resistance to coloration caused by processing | Δ | ○ | ◎ | X | X | X |

(The unit of the indicated amounts is parts by mass.)
*1 Cellulose acetate having an acetylation degree of 55% (L-50, manufactured by Daicel Polymer Ltd.)
*2 ADK STAB FP-800 (trade name, manufactured by ADEKA Corporation)
*3 ADK STAB AO-60 (trade name, manufactured by ADEKA Corporation)
*4 ADK STAB 2112 (trade name, manufactured by ADEKA Corporation)
*5 ADK STAB PEP-36 (trade name, manufactured by ADEKA Corporation)

TABLE 2

| | Comparative Example | |
|---|---|---|
| | 4 | 5 |
| Cellulose acetate*1 | 100 | 100 |
| Phosphate compound-1*2 | 0.5 | 60 |
| Phenol compound-1*3 | | |
| Triaryl phosphite compound-1*4 | | |
| Diaryl pentaerythritol diphosphite compound-1*5 | | |
| Comparative phosphate compound-1 | | |
| Comparative phosphate compound-2 | | |
| Resistance to processing Torque (N · m) | excessive torque (>200) | Kneading was impossible due to poor compatibility |
| Resistance to coloration caused by processing | x | x |

Examples 4 to 9

Each cellulose ester-based resin composition was prepared in accordance with the respective formulations shown in Table 3 below. The thus obtained cellulose ester-based resin composition was extruded under the below-described processing conditions to produce a pellet, which was subsequently injection-molded at 240° C. to obtain a 1.6 mm×12.7 mm×127 mm test piece for flame retardancy test. The thus obtained test piece was subjected to the UL-94V flame retardancy test performed by the below-described method.

<Processing Conditions>
Instrument: TEX28V (manufactured by The Japan Steel Works, Ltd.)
Processing temperature: 230 to 240° C.

<UL-94V Flame Retardancy Test Method>
The thus obtained test piece of 127 mm in length, 12.7 mm in width and 1.6 mm in thickness was held vertically and a burner flame was brought into contact with the lower end of the test piece for 10 seconds. Then, the flame was removed and the time required for the flame ignited on the test piece to be extinguished was measured. Next, simultaneously with the flame extinction, a flame was again brought into contact with the test piece for the second time for 10 seconds, and the time required for the flame ignited on the test piece to be extinguished was measured in the same manner as in the first measurement. Further, at the same time, it was also evaluated whether or not a piece of cotton placed under the test piece was ignited by cinders falling from the test piece.

Based on the combustion time after the first and second contacts with flame, the presence or absence of ignition of the piece of cotton and the like, the condition of the combustion was rated in accordance with the UL-94V standard. The combustion rating of V-0 represents the highest level of flame retardancy, followed by the ratings of V-1 and V-2 that represent lower levels of flame retardancy. When a test piece did not correspond to any of the ratings V-0 to V-2, it was indicated as "NR".

TABLE 3

|  | Example | | | | | |
| --- | --- | --- | --- | --- | --- | --- |
|  | 4 | 5 | 6 | 7 | 8 | 9 |
| Cellulose acetate*[1] | 90 | 89.8 | 89.8 | 89.8 | 89.6 | 89.6 |
| Phosphate compound-1 *[2] | 10 | 10 | 10 | 10 | 10 | 10 |
| Phenol compound-1 *[3] |  | 0.1 | 0.1 |  | 0.1 | 0.1 |
| Triaryl phosphite compound-1 *[4] |  | 0.1 |  |  | 0.1 |  |
| Diaryl pentaerythritol diphosphite compound-1 *[5] |  |  | 0.1 |  |  | 0.1 |
| Polytetrafluoroethylene |  |  |  | 0.2 | 0.2 | 0.2 |
| Flame retardancy rating by UL-94V (1.6 mm) | V-2 | V-2 | V-2 | V-0 | V-0 | V-0 |

(The unit of the indicated amounts is parts by mass.)
*[1] Cellulose acetate having an acetylation degree of 55% (L-50, manufactured by Daicel Polymer Ltd.)
*[2] ADK STAB FP-800 (trade name, manufactured by ADEKA Corporation)
*[3] ADK STAB AO-60 (trade name, manufactured by ADEKA Corporation)
*[4] ADK STAB 2112 (trade name, manufactured by ADEKA Corporation)
*[5] ADK STAB PEP-36 (trade name, manufactured by ADEKA Corporation)

<Evaluation of Heat Resistance>

For each compound or mixture shown in Table 4 below, the 5% weight reduction temperature (° C.) was measured at a heating rate of 10° C./min and an air flow rate of 200 ml/min using a calorimeter (manufactured by Rigaku Corporation). The results thereof are shown in Table 4 below.

TABLE 4

|  | Reference Example 1 | Comparative Reference Example 1 |
| --- | --- | --- |
| Phosphate compound-1*[2] | 100 |  |
| Comparative phosphate compound-2 |  | 80 |
| Triphenyl phosphate |  | 20 |
| 5% weight reduction temperature (° C.) | 407 | 340 |

As clearly seen from the results of Reference Example 1 and Comparative Reference Example 1 that are shown in Table 4 above, the phosphate compound represented by the Formula (1) has superior heat resistance as compared to the existing phosphate compounds.

The invention claimed is:

1. A cellulose organic acid ester composition, characterized by comprising 10 to 35 parts by mass of a phosphate represented by the following Formula (1) with respect to 100 parts by mass of a cellulose organic acid ester:

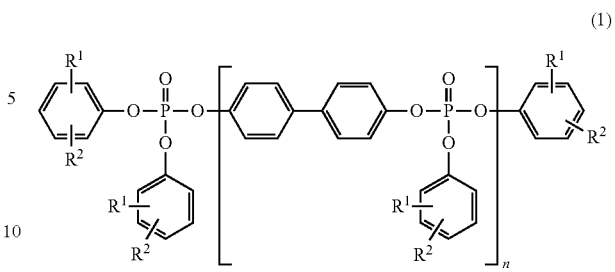

wherein, $R^1$ and $R^2$ each independently represent a hydrogen atom or a methyl group; and n represents an integer of 1 to 5, further comprising a phenol compound represented by the following Formula (2) in an amount of 0.01 to 10 parts by mass with respect to 100 parts by mass of said cellulose organic acid ester:

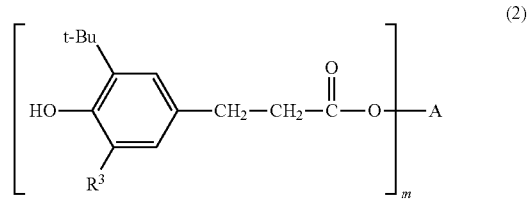

wherein, $R^3$ represents an alkyl group having 1 to 4 carbon atoms; m represents an integer of 1 to 4; and A represents a residue of a mono- to tetra-hydric alcohol from which m hydroxyl groups are removed, further comprising a triaryl phosphite compound represented by the following Formula (3) or a diaryl pentaerythritol diphosphite compound represented by the following Formula (4), in an amount of 0.01 to 10 parts by mass with respect to 100 parts by mass of said cellulose organic acid ester:

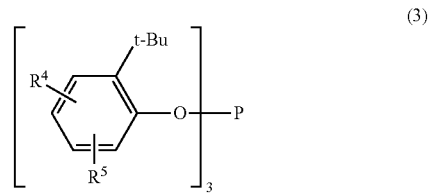

wherein, $R^4$ and $R^5$ each independently represent a hydrogen atom or an alkyl group having 1 to 4 carbon atoms and

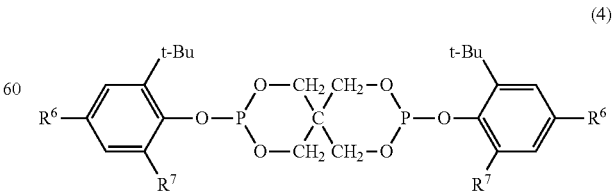

wherein, $R^6$ and $R^7$ each independently represent a hydrogen atom or an alkyl group having 1 to 4 carbon atoms;

further comprising 0.05 to 5 parts by mass of a polytetrafluoroethylene with respect to 100 parts by mass of said cellulose organic acid ester.

2. The cellulose organic acid ester composition according to claim 1, wherein said cellulose organic acid ester is a cellulose ester of a carboxylic acid having 2 to 6 carbon atoms.

3. The cellulose organic acid ester composition according to claim 1, wherein said cellulose organic acid ester is cellulose acetate.

4. A molded article, characterized by being obtained by molding the cellulose organic acid ester composition according to claim 1.

5. A method for producing a molded article, comprising molding the cellulose organic acid ester composition according to claim 1 by melt-kneading with an extruder.

6. A cellulose organic acid ester composition, characterized by comprising 10 to 35 parts by mass of a phosphate represented by the following Formula (1) with respect to 100 parts by mass of a cellulose organic acid ester:

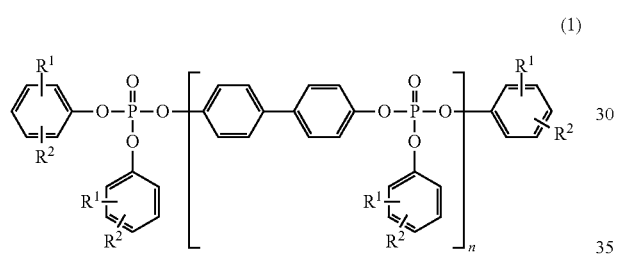

wherein, $R^1$ and $R^2$ each independently represent a hydrogen atom or a methyl group; and n represents an integer of 1 to 5, further comprising a phenol compound represented by the following Formula (2) in an amount of 0.01 to 10 parts by mass with respect to 100 parts by mass of said cellulose organic acid ester:

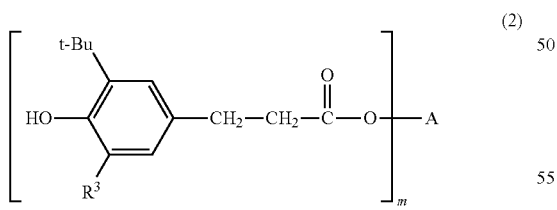

wherein, $R^3$ represents an alkyl group having 1 to 4 carbon atoms; m represents an integer of 1 to 4; and A represents a residue of a mono- to tetra-hydric alcohol from which m hydroxyl groups are removed, further comprising a triaryl phosphite compound represented by the following Formula (3) in an amount of 0.01 to 10 parts by mass with respect to 100 parts by mass of said cellulose organic acid ester:

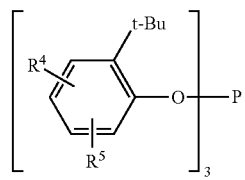

wherein, $R^4$ and $R^5$ each independently represent a hydrogen atom or an alkyl group having 1 to 4 carbon atoms, further comprising 0.05 to 5 parts by mass of a polytetrafluoroethylene with respect to 100 parts by mass of said cellulose organic acid ester.

7. A cellulose organic acid ester composition, characterized by comprising 10 to 35 parts by mass of a phosphate represented by the following Formula (1) with respect to 100 parts by mass of a cellulose organic acid ester:

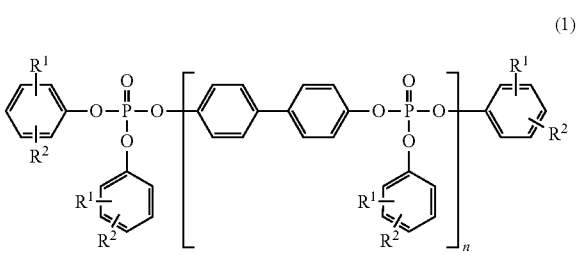

wherein, R1 and R2 each independently represent a hydrogen atom or a methyl group; and n represents an integer of 1 to 5, further comprising a phenol compound represented by the following Formula (2) in an amount of 0.01 to 10 parts by mass with respect to 100 parts by mass of said cellulose organic acid ester:

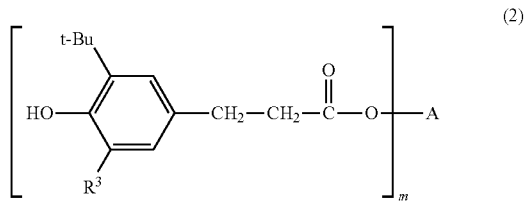

wherein, R3 represents an alkyl group having 1 to 4 carbon atoms; m represents an integer of 1 to 4; and A represents a residue of a mono- to tetra-hydric alcohol from which m hydroxyl groups are removed, further comprising a diaryl pentaerythritol diphosphite compound represented by the following Formula (4) in an amount of 0.01 to 10 parts by mass with respect to 100 parts by mass of said cellulose organic acid ester:

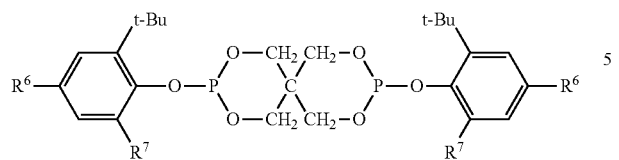 (4)
wherein, R6 and R7 each independently represent a hydrogen atom or an alkyl group having 1 to 4 carbon atoms,
further comprising 0.05 to 5 parts by mass of a polytetrafluoroethylene with respect to 100 parts by mass of said cellulose organic acid ester.
* * * * *